United States Patent [19]
Wiedenmann

[11] 3,892,663
[45] July 1, 1975

[54] HOME FISH-TANK FILTER CONSTRUCTION

[75] Inventor: Walter Wiedenmann, Kongen, Germany

[73] Assignee: Gunther Eheim, Esslingen, Germany

[22] Filed: June 28, 1973

[21] Appl. No.: 374,794

[30] Foreign Application Priority Data
Aug. 1, 1972  Germany............................ 2237774

[52] U.S. Cl. ................. 210/169; 210/286; 210/320; 210/416
[51] Int. Cl............................................... E04h 3/20
[58] Field of Search ........... 210/169, 195, 286, 320, 210/416; 119/5

[56] References Cited
UNITED STATES PATENTS

| | | | |
|---|---|---|---|
| 3,152,987 | 10/1964 | Gare | 210/169 |
| 3,511,376 | 5/1970 | Sesholtz | 210/169 |
| 3,513,978 | 5/1970 | Newsteder | 210/169 |
| 3,635,344 | 1/1972 | Lovitz | 210/169 |
| 3,669,297 | 6/1972 | Willmger | 210/169 |
| 3,693,798 | 9/1972 | White | 210/169 |
| 3,719,278 | 3/1973 | Kolfertz | 210/169 |
| 3,768,652 | 10/1973 | Jardim | 210/169 |
| 3,774,766 | 4/1973 | Block | 210/169 |

*Primary Examiner*—Theodore A. Granger
*Attorney, Agent, or Firm*—Flynn and Frishauf

[57] ABSTRACT

A filter housing is connected to a water pump located at the bottom of the housing such that water can be sucked from the fish-tank directly into the pump, to then be expelled from the pump and forced to flow upwardly through a first filter chamber; an overflow partition separates the first filter chamber from a plurality, typically two further filter chambers, the further filter chambers being alternately interconnected at the bottom by communicating openings, or by overflow partitions, the last chamber in the filter construction being arranged to have water rising to the top level within the filter structure, and a slanting downwardly directed trough is connected to the last overflow so that water will flow by gravity freely back into the fish-tank or aquarium. The final chamber in the filter structure may include a heating element, the overflow being hook-shaped to simultaneously form an attachment of the filter structure to the fish-tank.

15 Claims, 7 Drawing Figures

HOME FISH-TANK FILTER CONSTRUCTION

The present invention relates to a fish-tank filter construction, and more particularly to the construction of an external filter for home aquariums or the like, in which the structure is sub-divided into a plurality of chambers, and is adapted for combination with a pump for circulating water through the filter, the filter having various sections adapted to be filled with filter material of different fineness or grade.

Water filters for aquariums are well known (see, for example, German Published Pat. Application DT-As No. 1,911,090). Water filters of this type, and other known types permit good and effective cleaning of water in aquariums, since the filters having various chambers can be charged with various types of filter materials, such as coarse filters, medium filters, and fine filters, for example. Usually, such filter chambers are square and are formed with, or have a hanger associated therewith so that they can be hooked on the fish-tanks, either at the outside or inside thereof.

The water to be circulated through the filter is usually moved by an air injection pump, or the like, which is so arranged that the contaminated water from the filter is guided to the upper side or surface of the filter chamber, from where the water flows downwardly through the filter, the then purified and filtered water being removed from the lower side of the filter chamber. It may either run off by gravity, or be sucked off by the pump. Various types of filter constructions are known in which an electrically driven pump is associated with the filter, which, in principle, have a similar flow of water.

Cleaning of filters of this type is often difficult and therefore not carried out with sufficient frequency. Further, it is difficult to sub-divide the filter into filter chambers with different filter substances, that is, with coarse, medium and fine filter substances.

It is an object of the present invention to provide a water filter for home aquariums which can be easily and rapidly cleaned, which is simple, and reliable in operation while providing for effective treatment of the aquarium water, and which requires only a minimum of space.

SUBJECT MATTER OF THE PRESENT INVENTION

Briefly, the filter structure is so arranged that a first filter chamber is provided through which the water flows from the bottom to the top, that is, upwardly, under forced, positive pumped pressure, and then flows over an overflow into a further chamber, a free water level of predetermined height being established by the height of the overflow. Various filter chambers may be provided in the filter, the final chamber having water supplied thereto, like the first, where water flows from the bottom upwardly, and being connected to an outflow trough which returns the water back into the aquarium. In accordance with a preferred embodiment, the outflow trough is hook-shaped at the end so that the filter can be hooked to the aquarium by the trough.

The filter chambers in the filter construction, in accordance with a feature of the present invention, are so arranged that the first filter chamber, through which water flows upwardly, is a rapid or coarse filter which can be readily cleaned by removal of the filter substance from the top. The further additional filter chambers, if used, can provide for additional filtration of the water.

In a preferred form, two filter chambers are provided after the first, which communicate with each other through an opening formed close to the bottom of the filter structure. The first chamber then forms the coarse or rapid filter, and the additional filter chambers are preferably charged with a fine, or intermediate filter in one, and a micro or bio-filter in the second filter chamber. Water flow is ensured through the second and third filter chambers, while additionally providing for effective filtration of the water, which communicates between the second and third chamber through a submerged duct, thus avoiding turbulence of water. Since all filter chambers will have a constant water level, the cleaning effectiveness of the filter will remain constant.

The third filter chamber, in accordance with a feature of the invention, may be connected to a heating element in a heating chamber which, in turn, is connected to the outflow trough. An additional outflow trough can be provided and communicating with the first or the second filter chamber in order to permit return of water in case of stoppages in the second or third filter chamber.

Forming the outflow trough in hook shape, so that the filter can be attached to the aquarium by the outflow trough has been proposed previously (see the aforementioned DT-AS No. 1,911,090). Since various types of aquariums, however, have a different thickness, and particularly may have different frames of widely varying edge thicknesses, reliable attachment of the filter by the hook-shaped overflow has not always been ensured. In accordance with a feature of the invention, therefore, the outflow trough of the filter is directed to incline downwardly, so that the aquarium side wall will be pinched between the outflow trough and the filter, thereby securing the filter reliably to the aquarium wall. The aquarium wall, in order to permit such pinching to aquariums of different width, may be formed with a plurality of projecting pins, or stubs, projecting laterally at various dimensions from the filter body, and adapted to be surrounded by a rubber bushing, or the like, so that various thicknesses of the aquarium side wall can be compensated for.

In accordance with a preferred form of the invention, the pump is removably secured to the filter body structure; the pump may have, for example, the construction referred to in the co-pending cross-referenced application, and be connected thereto by means of a bayonet catch or the like.

It is usually preferred to use a pump which is not self-priming. Such pumps, however, then require filling of the inlet tube to the pump, upon operation, with water. Preferably, therefore, the inlet or suction tube from the aquarium to the pump is provided with a check valve which permits filling the inlet tube with water by merely moving the tube up and down within the aquarium. In order to prevent introducing large contaminating particles into the pump, a pre-filter or screen is preferably connected to the inlet of the suction tube. It is of advantage to so construct the first filter chamber that it can be fitted with a water permeable insert, into which the filter material is placed, and which includes a centered stub through which the inlet tube can pass, the central stub leading to approximately the vicinity of the water level. The suction tube can then be located within this central stub, and connected to the suction stub of the pump by means of a friction connection, which easily permits the up and down movement of the inlet tube within the aquarium, in order to fill the inlet tube, since the central stub guides the tube in its vertical movement.

The invention will be described by way of example with reference to the accompanying drawings, wherein.

Figure 1:
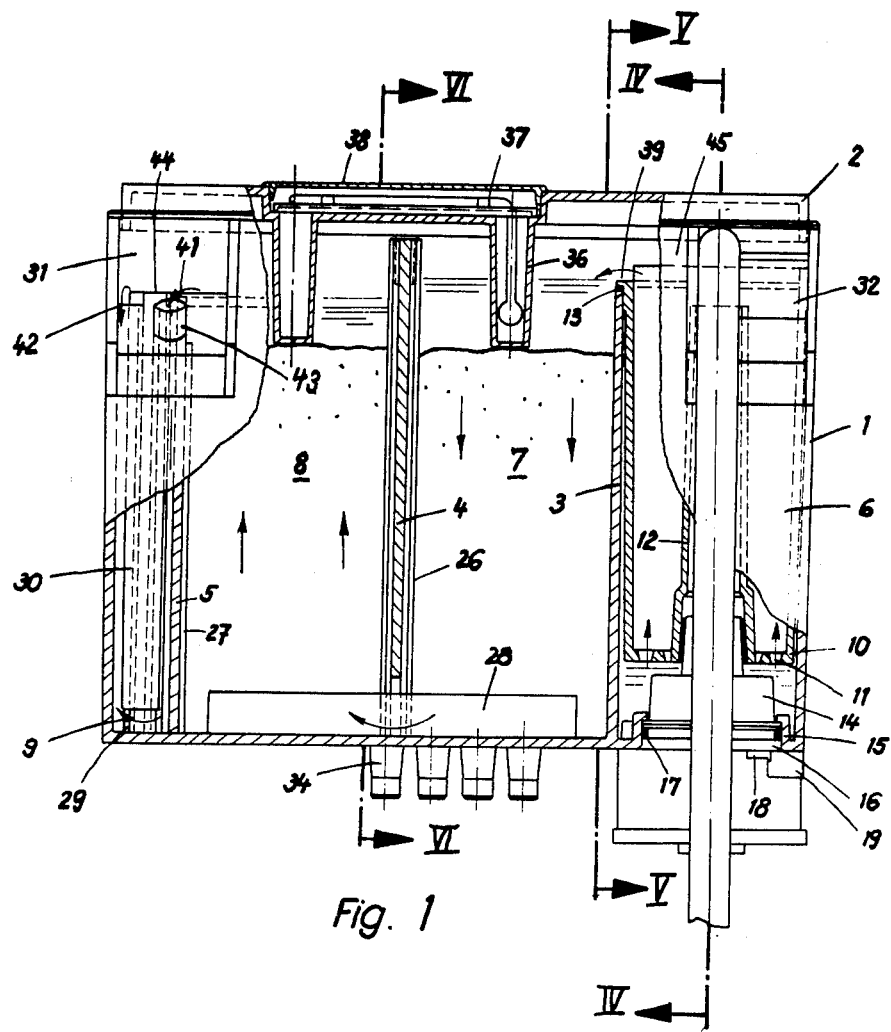
FIG. 1 is a longitudinal, partly sectional, partly broken away view of the filter.

The filter has a generally rectangular filter housing 1 (FIG. 1) on which a cover 2 is applied, to securely close the filter. Filter housing 1 is separated by three separating walls, 3, 4, 5 into four chambers 6, 7, 8, 9. Chambers 6, 7, 8 are filter chambers which include filter material which, in chambers 7, 8, is located, for example, in filter bags. An insert 10 is placed into filter chamber 1, filling approximately its entire volume, and having a sieve, or gridlike bottom 10, to which a vertical pipe stub 12 is attached. Stub 12 fits into the interior of insert 10. Insert 10 hangs in filter chamber 1, being supported by an overhanging edge or shoulder 13 fitting against separating wall 3.

The bottom of the first filter chamber 6 has an electric pump 14 attached thereto which is secured to the bottom portion 15 of the filter chamber, so that it can be removed from the outside. Pump 14 is formed with a cylindrical projection 16 which is in slidable engagement with a suitable opening in the bottom 15, preferably cylindrical, and in which a sealing O-ring 17 is inserted. The pump 14 has a pair of peripherally projecting cams, or ridges 18 which, together with holders 19 formed on the bottom 15 of the filter chamber 6 are arranged in the form of a bayonet catch which permits removal of the pump 15 for servicing or maintenance, or cleaning.

The suction stub 20 of the pump 14 (FIG. 4) extends into the stub 12 within the insert 10. A suction tube 21 is connected to stub 14, for example by a slip and interference fit. The free opening of the suction tube 21 is connected to a suction cage 22 which takes water from the aquarium, and is submerged therein. The upper portion of the filter cage 22 has a check valve 23 therein, formed for example as a flap valve or the like, as will be explained below.

The pressure outlet of pump 14 is seen at 24 (FIG. 4) and terminates in a chamber 25 beneath the insert 10 of the filter chamber.

Separating wall 3 is fixed in the filter housing 1. Separating walls 4, 5 are removably inserted into the filter housing. The filter housing 1 has suitably shaped guide rails 26, 27 secured thereto (FIG. 3) in which the walls 4, 5 are slidably guided. The lower edge of separating wall 4 fits against longitudinally extending rails 28 (FIG. 6), spaced from each other, to form a connection between the filter chambers 7, 8, at the bottom of the chambers.

Longitudinal ridges 29 are formed on the bottom of the filter chamber housing 1 in the region of the third chamber 9. A heating element 30 is supported on the ridges 29 in such a manner that water can circulate between the lower portion of heating element 30 and the bottom of the filter housing 1.

Figure 2:
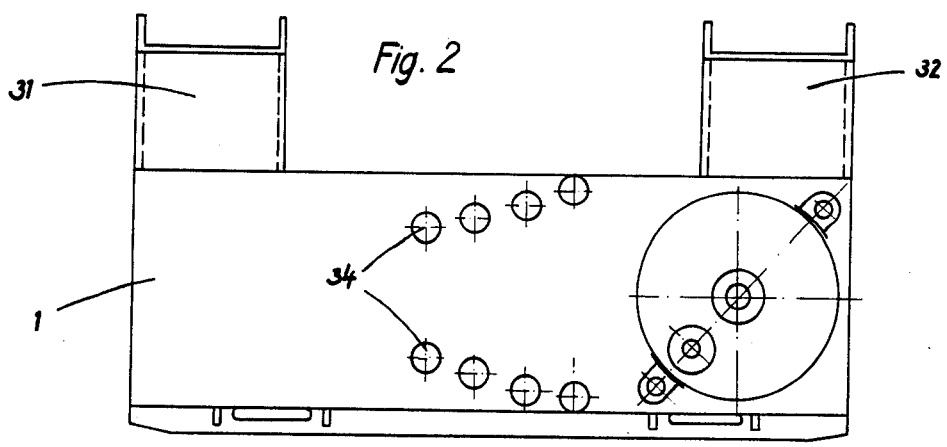
FIG. 2 is a bottom view of the filter.
Figure 3:
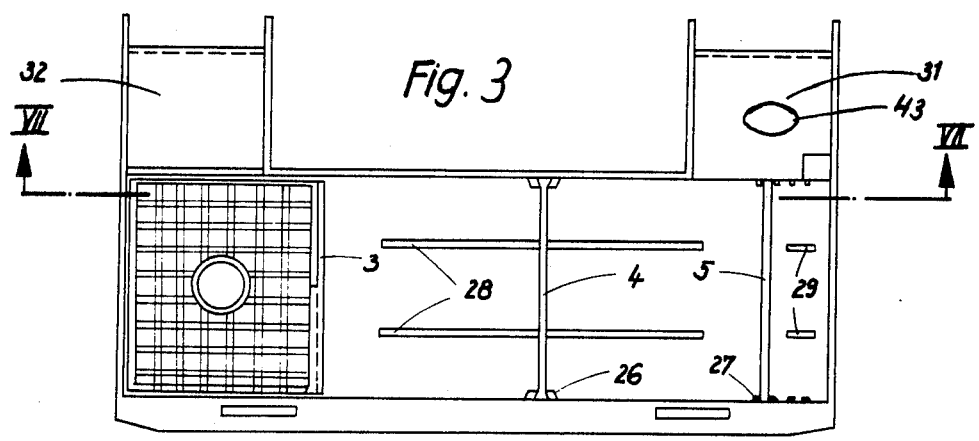
FIG. 3 is a top view of the filter.
Figure 4:
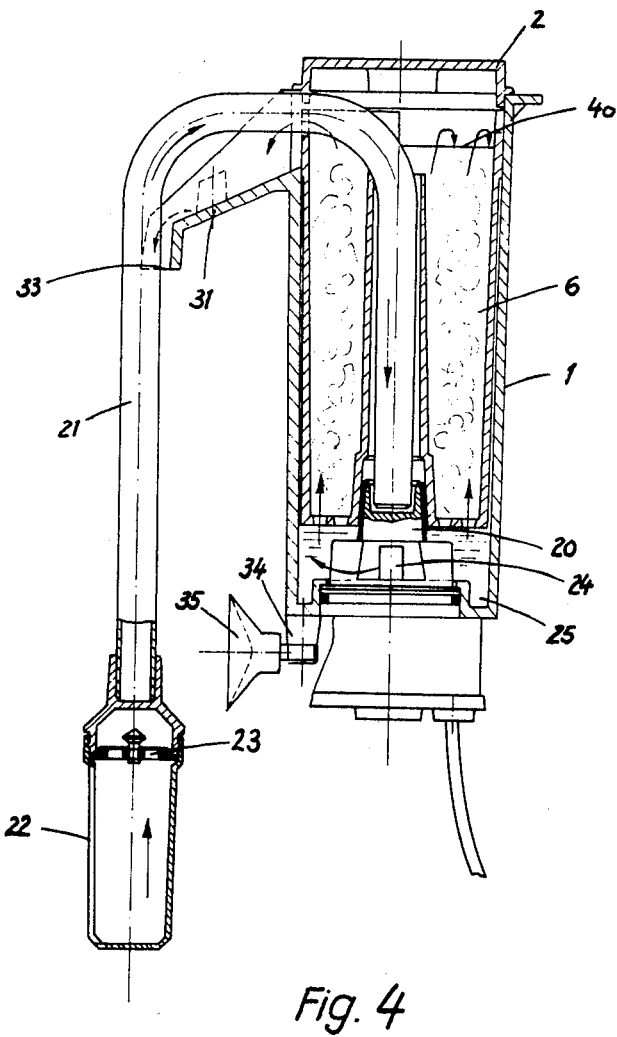
FIG. 4 is a transverse sectional view along line IV—IV of FIG. 1.
Figures 5, 6:
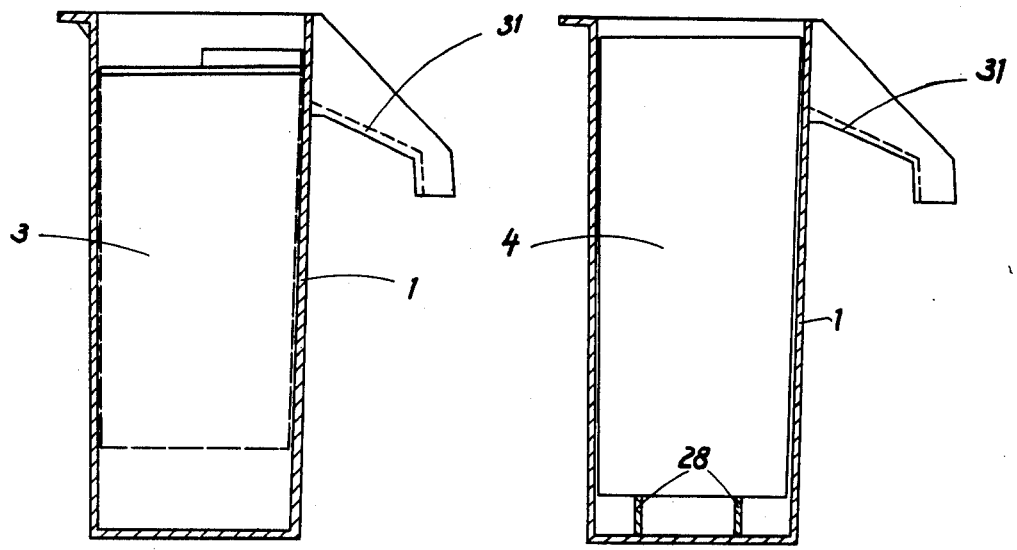
FIGS. 5 and 6 are longitudinal sectional views along lines V—V and VI—VI of FIG. 1, respectively.
Figure 7:
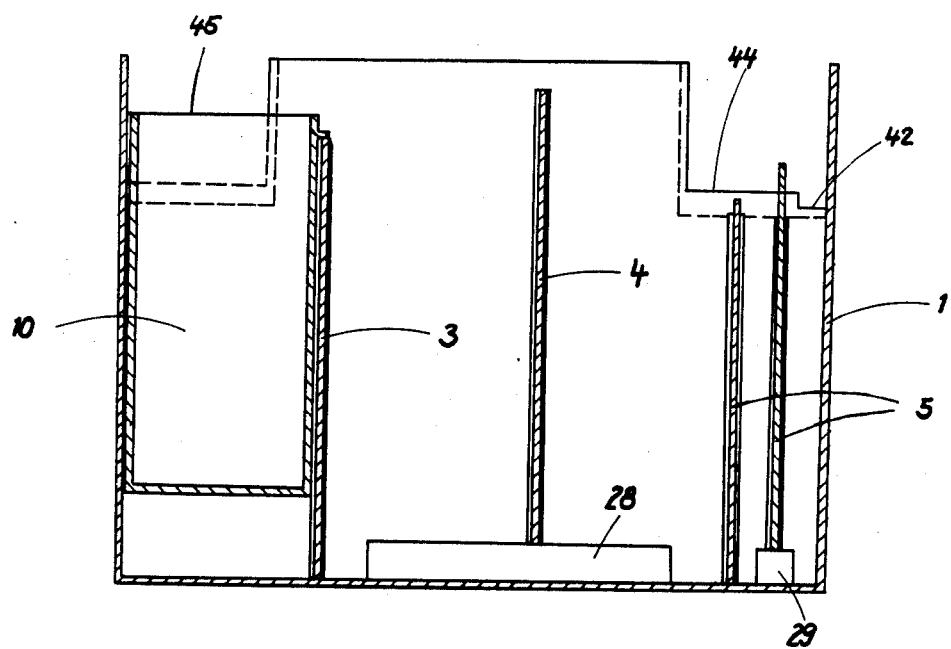
FIG. 7 is a sectional longitudinal view along line VII—VII of FIG. 3.

A pair of outlet troughs, or guide ways or gutters 31, 32 are formed at the side of the filter housing 1, as best seen in FIGS. 2, 3 and 6. They extend in a downwardly inclined direction outwardly from the filter housing. The lower portions of the troughs 31, 32 include an angle which is less than 90°, for example about 60°. The two outlet troughs, which thus have a downward drop, are formed at their end with a hook-shaped portion 33 (FIG. 4) which prevents unintentional removal of the filter housing from the side wall of the aquarium by unintentional tipping of the filter.

Projecting pins 34 are formed on the lower portion of the filter 1 (FIGS. 2, 4) and arranged to be located along two relatively inclined lines, so that the respective pins 34 have different distances from the adjacent side wall of the filter unit 1. The pins 34 permit selective attachment of support bearing elements 35, formed as suction cups with projecting clips (FIG. 4) which permits selective application of the suction cups to the pins 34, to adjust the relative position of the side wall of the filter housing 1 from the side wall of the aquarium with which it is associated, when the troughs 31, 32 are hooked by means of the terminal hooks 33 over the edge of the filter wall, from either the outside or the inside thereof. Since the outlet troughs are inclined with respect to the associated side wall of the filter housing 1, the attachment is secure since the upper edge of the aquarium or fish-tank side wall will fall in the converging region between the side wall of the filter and the inclined edge of the outlet troughs 31, 31. Outlet trough 31 has an inner overflow edge 42 slightly lower than overflow edge 41 between chambers 8 and 9. Overflow trough 30 has an inner overflow edge 45 which is higher than the overflow edge 40 separating chambers 6 and 7.

The cover 2 has two hollow pins 36, open to the outside, formed thereon, which extend into the filter chambers 7, 8; one of which may include a thermometer 37 (FIG. 1) so arranged that it can be read from the outside through a transparent cover portion 38.

Operation: The filter casing or housing 1 is hung over the edge wall of a fish-tank by means of the outlet troughs 31, 32, and located, preferably vertically, with respect to the fish-tank wall by placing one of the suction cups, or similar rubber bearing elements 35 on a suitable stub 34, so that the filter is properly and securely attached to the fish-tank wall. The U-shaped suction tube, with its filter cage 22 is separated from the outlet stub of the pump and moved up and down several times within the water level of the fish-tank, in order to completely fill the suction tube. The friction fit of the suction tube 21 with the stub 20 of pump 14 readily permits removal and reconnection. Upon moving the suction tube 21 up and down, the tube 21 will be filled with water, the check valve 23 permitting introduction of water into the tube, but not backflow upon downward movement thereof. The suction tube 21, after having been filled, is attached to the pump by the slip fit of the tube with the pump stub 20, and the pump can then be started, to continuously suck water from the fish-tank. The water, sucked off by the pump 14 is placed under positive pressure in the space 25 beneath the insert 10. the overpressure causes the water to rise by penetrating through the perforated or sieve-like bottom 11 of the insert 10, and to fill the pump chamber 6, flowing from the bottom towards the top. Insert 10 is filled with a coarse filter mass, for example filter gravel, fiberglass, or similar substance. The water flow is indicated in FIG. 1 by arrows.

Water, after having been filtered by the filter material in insert 10, is pumped to reach the water level of the overflow formed by the edge of the separating wall, or the insert, and seen at 39 (FIG. 1). The overflow edge is indicated at 40 (FIG. 4). The overflow edge 40 ensures that a free water level will be established in the two filter chambers 6, 7 (FIG. 1). The separating wall 4 between the second filter chamber 7 and the adjacent third filter chamber 8 extends over this water level. The water, therefore, must flow from filter chamber 7 to the filter chamber 8, after having passed through the filter mass in chamber 7, as illustrated by the arrows in FIG. 1, that is, beneath the lower edge of the separating wall 4. In chamber 8, the water passes again upwardly through the filter mass therein. The separating wall 5 which separates filter chamber 8 again forms an upper overflow edge, as seen at 41 (FIG. 1), over which water can penetrate the fourth chamber 9, in which the heating element 30 is located. Upon overflow, the water will flow downwardly in chamber 9, the overflow 41 setting the free water level thereof, and for the chamber 8, and the water passes first along the heating element 30 from above towards the bottom; thereafter, it passes upwardly until it reaches the edge 42 of the outlet trough 31. The edge 42 of trough 31 is at a lower level, for example a slightly lower level than the edge 41 which established the water level of chamber 8. The inclination of trough 31 permits return of the water to the fish-tank or aquarium by gravity.

A flow turbulence element 43 (FIGS. 3, 4), for example in the form of a projecting pin, is located in the outflow trough 31 in order to generate turbulence of the water flowing in the trough and thereby obtain oxygenation of the water.

Outlet trough 31, as best seen in FIG. 1, extends preferably essentially over the entire chamber 9 associated with the heating element 30, and also at least in part over the third filter chamber 8; if there should be interruption of water flow through chamber 9, water can then flow directly over a slightly higher edge 44 into the outlet trough 31. By placing the outlet edge 42 from chamber 9 at a lower level, the heating element is always reliably covered by circulating water.

The water level in the various chamber 6, 7, 8, 9 will be constant for uniform operating conditions. If, for example, passage of water through the filter chamber 8 is inhibited, for example due to contaminated or plugged filter material, the water level in the two chambers 6, 7 will rise until the water can pass over the edge 45 of the outlet trough 32 directly into the aquarium. The pins or projections 36 which extend below the water level in chambers 7, 8, press downwardly on the filter material and prevent floatation of the filter material. The separating wall 4 between the two chambers 7, 8 is preferably removable, so that the filter material in the two filter chambers can be suitably selected. The wall 4 is guided at its ends in tongue-and-groove fittings of dovetail shape (FIG. 3). This contributes additionally to the stiffness of the filter chamber or casing 1, particularly in transverse direction and prevents spreading of the walls of casing 1. The tongue-and-groove connection may, of course, also determine the depth of insertion of the separating wall 4.

The filter of the described example utilizes three filter chambers 6, 7, 8 and a heating chamber 9. Various changes and modifications, particularly in the arrangement can be made. Thus, a plurality of filter chambers, one behind the other, can be provided, for example by multiplying the number of guide tracks 26, and providing additional separating walls, of suitable height, to provide for proper water flow. It is of course also possible to utilize the construction of the present invention with only two filter chambers by omitting the separating walls 4, or 5, respectively.

I claim:

1. In the combination with an aquarium, a filter and pump assembly comprising a filter housing (1) located outside of the aquarium;

means (3, 4, 5) sub-dividing the housing to define at least a first (6), a second (7) and a third (8) filter chamber therein in a serial fluid flow communication;

filter media inside the chambers;

positive pump means (14) having a suction pump inlet means (20) in fluid communication with the aquarium tank, and a pressure outlet directly connected to the bottom of the first filter chamber (6) and supplying aquarium water, to be filtered under pressure from below, upwardly, through the first chamber, the filter media in said first chamber (6) being coarse with respect to the media in the second and third chambers a first overflow (39, 40) at the sub-dividing means between the first (6) and second (7) filter chambers to determine the level of water forced into the first chamber (6);

a fluid connection in the subdivision means located adjacent the bottom of the filter housing (1) between the second and third chambers (7, 8); and an outlet trough (31) in fluid communication with the third filter chamber (8) and having an overflow edge (41, 42) adjacent the third chamber which is located at a level lower than said first overflow (39, 40) whereby water will be filtered by filter substance located in the first chamber (6) and flow under positive pressure upwardly therethrough, and water will be filtered by filter substance located in the second and third chambers (7, 8) and then can return to the aquarium through the outlet trough (31) after spilling over the overflow edge (41, 42).

2. Filter according to claim 1, further comprising sub-dividing means (5) within the housing to define a fourth chamber (9), a heating element (30) within the fourth chamber, the overflow edge leading to the outlet trough (31) communicating with said fourth chamber.

3. Filter according to claim 2, wherein the water in the fourth chamber is guided from the top downwardly and again upwardly around said heating element (30), and into the overflow edge (41) leading to the outlet trough, to pass in counterflow around the heating element.

4. Filter according to claim 1, wherein said subdividing means (4) sub-dividing the filter housing (1) into second and third chambers (7, 8) extends above the overflow level of said first overflow (39, 40).

5. Filter according to claim 4, wherein opposite walls of the filter housing are formed with inwardly directed ridges (26) and said sub-dividing means comprises a sub-dividing wall (4) having enlarged edges, the edges of the wall (4) and the ridges (26) forming an interlocking dovetail connection to removably retain the wall in the housing while stiffening the housing when the wall is inserted therein.

6. Filter according to claim 1, further comprising a second outlet trough (32) having a second overflow edge (45) located adjacent the first filter chamber (6), said second overflow edge (45) being located at a level which is higher than said first overflow (39, 40).

7. Filter according to claim 2, wherein a third overflow edge (44) communicates between the third filter chamber (8) and the overflow edge communicating with said outlet trough (31), to provide for flow of water through said trough (31) in case of interference with fluid flow through said heating chamber (9) by permitting water flow over said third overflow edge (44).

8. Filter according to claim 1, wherein said outlet trough (31) is inclined downwardly and projects approximately transversely from the filter housing (1).

9. Filter according to claim 1, further comprising turbulence causing means (43) located in the outlet through (31).

10. Filter according to claim 1, wherein the outlet trough (31) projects laterally from the filter housing and is inclined downwardly;
at least one projecting pin (34) located adjacent the lower portion of the filter housing and facing the aquarium;
and resilient support means (35) secured to said pin, extending in the same lateral direction as said trough, and adapted to bear against the side wall of the aquarium, and permit hooking the filter housing over the edge of the aquarium by means of said trough.

11. Filter according to claim 1, further comprising a removable cover (2) on said filter housing (1);
a hollow projection (36) extending from said cover below the water level established by at least the first overflow, and a thermometer (37) having its temperature sensing element within said hollow projection.

12. Filter according to claim 1, wherein said pump means (14) comprises an electric pump and motor assembly, having a suction stub (21) extending through said first filter chamber (6); and releasable attaching means associated with the bottom of the filter and with the pump to removably secure the pump (14) into the bottom portion (15) of the first filter chamber.

13. Filter according to claim 1, further comprising a removable filter carrier (10) inserted into said first filter chamber (6), said filter carrier comprising a pipe stub (12) passing therethrough and extending to approximately the level of the water within the first filter chamber as determined by said first overflow (39, 40).

14. Filter according to claim 13, further comprising an inlet suction tube (21) communicating water to be filtered from the aquarium and extending through the interior of the stub (12), said inlet suction tube (21) having a friction engagement fit with the inlet means (20) of the pump (14).

15. Filter according to claim 1, further comprising internally projecting ridges (18) formed on the bottom wall of the filter housing, said internally projecting ridges forming a separating and stop element for said sub-dividing means to provide for fluid communication between adjacent filter chambers at the bottom of the filter.

* * * * *